Sept. 24, 1968

H. A. SLATER ET AL 3,403,215

MOUNTING MEANS ELECTRICAL WIRING DEVICES

Filed April 5, 1967

INVENTORS
HERBERT A. SLATER
PIERRE HASKELSON

BY *Davly & Denly*

ATTORNEYS

Sept. 24, 1968

H. A. SLATER ETAL 3,403,215

MOUNTING MEANS ELECTRICAL WIRING DEVICES

Filed April 5, 1967

INVENTORS
HERBERT A. SLATER
PIERRE HASKELSON

BY *Darby & Darby*

ATTORNEYS

United States Patent Office 3,403,215
Patented Sept. 24, 1968

3,403,215
MOUNTING MEANS FOR ELECTRICAL
WIRING DEVICES
Herbert A. Slater, New York, and Pierre Haskelson,
Huntington, N.Y., assignors to Slater Electric Inc.,
Glen Cove, N.Y., a corporation of New York
Filed Apr. 5, 1967, Ser. No. 628,622
10 Claims. (Cl. 174—53)

ABSTRACT OF THE DISCLOSURE

This application discloses means for rapidly and adjustably mounting an electrical wiring device in the usual outlet box. It consists of a mounting strap with a serrated spike fixed thereto, but movable transversely thereof at one end, together with a camming member at the other end cooperating with the ordinary mounting screw. The serrated spike extends at an angle to the perpendicular to the mounting strap to increase the locking engagement of the spike in the aperture of a mounting box ear when the mounting screw is threaded into the corresponding aperture in the ear at the opposite end of the outlet box.

---

The invention here disclosed is related to and an improvement upon the mounting means disclosed in the co-pending application of Herbert A. Slater, Ser. No. 563,792, filed July 8, 1966, and assigned to the assignee of the present invention.

At the present time, mounting devices such as switches and plug receptacles are mounted on straps which are designed to be fixed to outlet boxes, which are in turn fixed to structural members of a building and have their forward edges either flush with the wall surface or somewhat recessed with respect thereto. These outlet boxes are provided with an ear at each end, the ears having threaded apertures therein. The mounting straps are provided with extensions having portions adapted to overlie, and seat against the wall surface or the box ear, the extensions having transverse slots positioned to align with the box ear apertures. Mounting screws extending through the strap slots are then threaded into the ear apertures and the device thus mounted in position for use.

Since the time required for mounting wiring devices in a building constitutes a considerable portion of the building electrical installation, it is important to minimize this time.

In the co-pending application heretofore referred to, this is accomplished by substituting a serrated spike for one of the two mounting screws, the spike being either fixed to or integral with the strap, and extending perpendicular to the plane of the strap, and the opposite end of the strap is provided with a camming member cooperating with the ordinary mounting screw to thus force the strip toward the first-mentioned end of the box and cause firm engagement of the spike serrations with the threads of the corresponding box ear aperture as the screw is tightened.

The device of the co-pending application above mentioned is thus a considerable improvement over the mounting strap and screw arrangement presently in use; however, it has certain disadvantages which the present invention eliminates.

One of these disadvantages is that the mounting device cannot be adjusted in position relative to the box at the end where the spike is located, and it is therefore not possible to assure that the wiring device and the cover plate which is normally fixed either to the wiring device proper or to the mounting strap be oriented in the desirable vertical or horizontal position. Another disadvantage is that due to variations in the spacing between the box ear apertures, there is not in all instances complete assurance that the camming action will be sufficient to secure proper locking engagement of the spike and the cooperating threads.

By means of this invention, these and other disadvantages of the structure of the co-pending application are overcome. As will be seen, the device is furthermore usable whether the outlet box is mounted with its outer edge flush with the wall surface or recessed from that surface.

Various objects and features of the invention will become apparent when the following description is considered in connection with the annexed drawings, in which.

Figure 1:
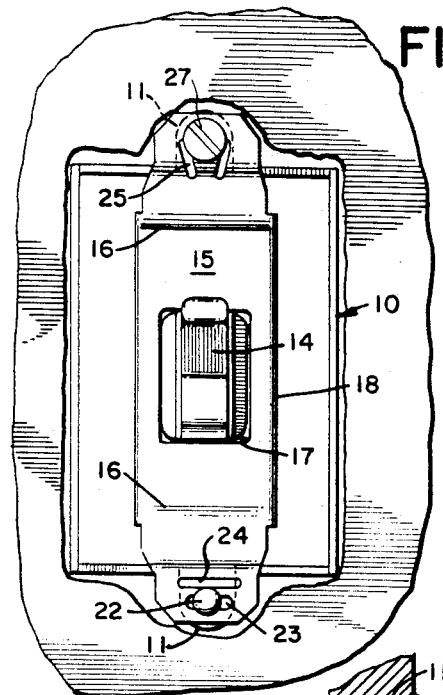
FIGURE 1 is a front-elevational view with the wall or cover plate removed, showing a switch mounted on a mounting strap, and the combined unit mounted in the usual outlet box in accordance with the instant invention.
Figure 2:
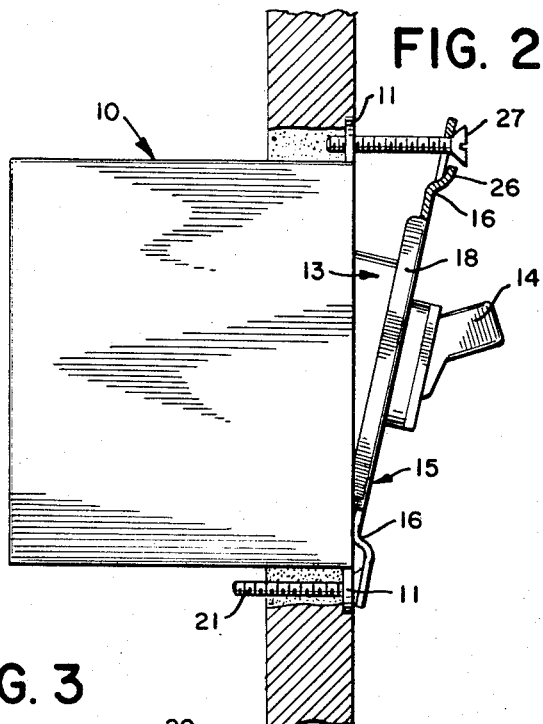
FIGURE 2 is a side-elevational view showing the switch and box of FIGURE 1 with the switch partially installed in the box.

Referring now to the drawings, and particularly to FIGURES 1 and 2, there is shown therein the usual outlet box or wall box 10, which is provided with the usual wiring device strap mounting ears 11 having the threaded apertures 12 therein. In the drawings, the electrical wiring device is shown as a switch 13 having the usual handle 14 extending through an opening in the mounting strap to which the switch or other device is fixed in any of the customary manners.

Figure 3:
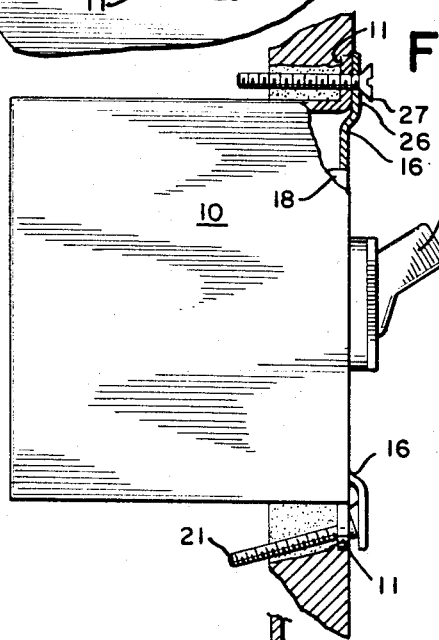
FIGURE 3 is a side-elevational view similar to FIGURE 2, but showing the completed mounting of the switch to the box.

The mounting strap 15 is conventional in many respects; it is, for example, provided with the rearward offsets 16, which serve to locate the mounting strap relative to the outlet box, with the aperture 17 in which the switch handle housing is mounted, and with the bent-over side flanges 18 also provided with conventional plaster ears such as indicated at 20 (FIGURES 4 and 6 through 8). The plaster ears have been broken along the score lines, as shown in FIGURES 1 through 3, as is usual when a wiring device in- is mounted in a box flush with the wall surface.

The strap of the present invention has been modified, however, with respect to the mounting of the lower fastening member designated 21. This fastening member is shown as a threaded spike which is of a smaller outer diameter than the internal diameter of the threaded opening 12 in the lower box ear. The threaded or serrated spike 21 is provided with a grooved head 22, which head is held captive in a slot 23 extending horizontally of the strap 15 and in position to register with the opening or threaded aperture in the box ear. The portion of the mounting strap adjacent the spike head 22 is bent inwardly along a slit 24 formed at the time the strap is stamped out, thus placing the spike 21 at an angle to the perpendicular to the strap.

Figure 4:
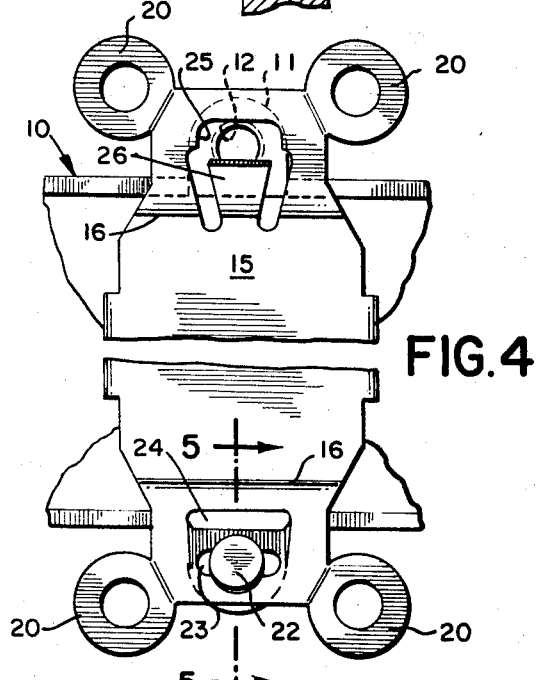
FIGURE 4 is a front-elevational view, to an enlarged scale, showing details of the construction of the strap, spike, and camming means.
Figure 5:
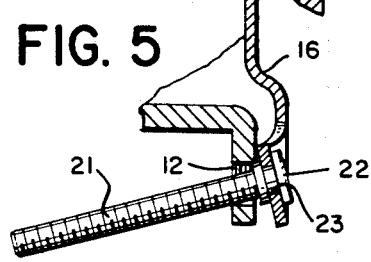
FIGURE 5 is a fragmentary cross-section view taken on the plane of the line 5—5 of FIGURE 4, showing particularly the mode of mounting the spike in the strap and the mode in which the spike grips the threaded opening in the outlet box ear.

Referring now particularly to FIGURE 4, it will be seen that at its upper end the strap is provided with an opening of generally inverted U shape 25, the portion between the arms of the U designated 26 being bent outwardly to form a camming surface, and the area above the upper edge of that camming surface forming essentially a horizontally extending slot which, as will be seen, permits of adjustment of the position of the mounting strap and hence of the wiring device relative to the outlet box 10, and thus permits the wiring device to be positioned on a vertical, or in some instances, a horizontal axis, despite the fact that the outlet box was not exactly positioned when installed.

As has been indicated, FIGURES 1 through 5 show the mounting strap and wiring device as installed in an outlet box which is flush with the wall surface. FIGURE 2 shows the first step in the installation, namely, the insertion of the spike 21 through the threaded aperture in the lower box ear 11, with a mounting screw 27 inserted through the opening 25 in the upper portion of the mounting strap, and threaded into the aperture 12 in the upper box ear 11.

FIGURE 3 shows the condition when the mounting screw 27 has been fully tightened, thus forcing the camming piece 26 inwardly into the plane of the mounting strap upper extension and forcing the entire strap 15 downwardly so that the screw or spike threads or serrations engage the threads of the box ear and lock the device in position at its lower end. It will be noted that in this case the spike remains at an angle to the perpendicular to the strap 15. This is true because although the configuration of the slit 24 is such that the material surrounding the slot 23 is bendable back into the plane of the mounting strap when sufficient force is exerted, there is insufficient leverage with flush mounting to cause this to occur.

Figure 6:
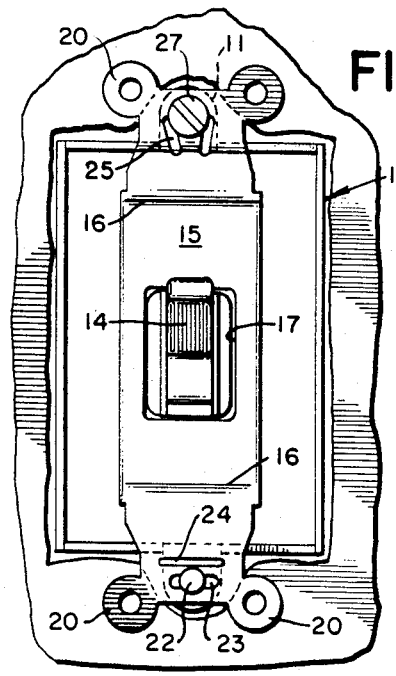
FIGURE 6 is a view similar to FIGURE 1, but showing the mounting of the electrical wiring device in an outlet box when that box is recessed behind the wall surface.
Figure 7:
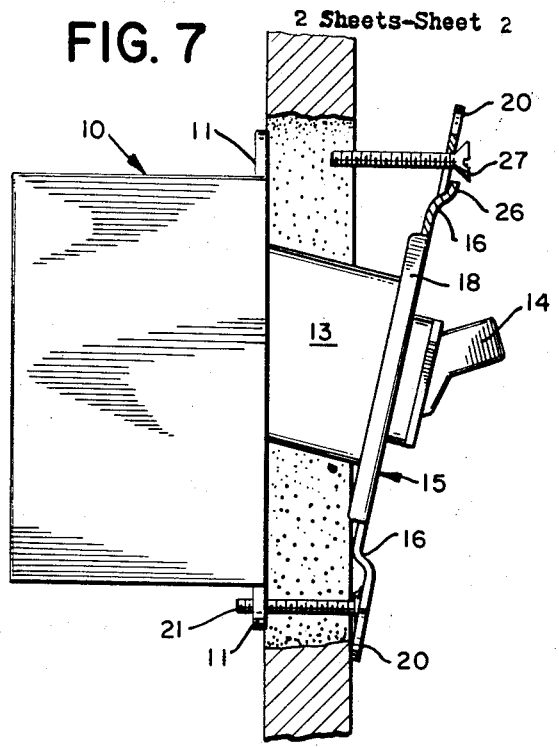
FIGURE 7 is a side-elevational view of the partially completed mounting of the device of FIGURE 6 in an outlet box.
Figure 8:
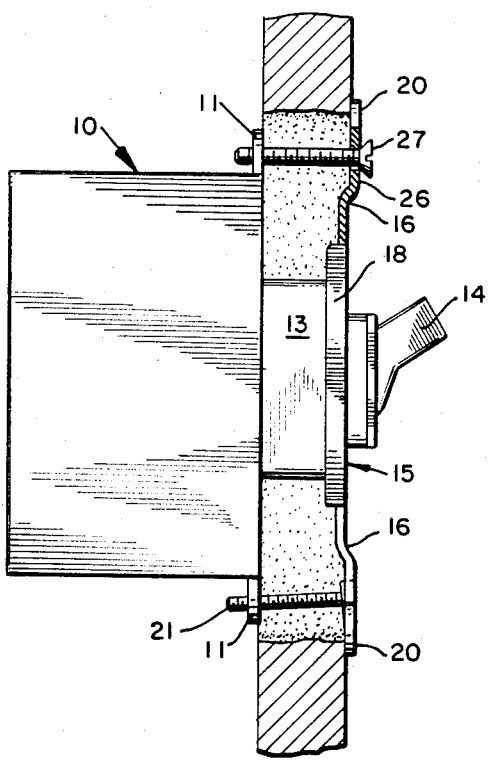
FIGURE 8 is a side-elevational view similar to FIGURE 7, but showing the device completely mounted.

Referring now to FIGURES 6, 7, and 8, which show the mounting strap and fastening arrangements of the present invention in use in connection with a box which is mounted in a recessed position relative to the wall surface, it will be seen that the process of installation is exactly similar to that described. However, in this instance, since the lower box ear 11 is spaced from the mounting strap, there will be a considerable amount of leverage exerted on the spike as the upper mounting screw 27 is placed into position in alignment with the upper box ear aperture and the mounting screw tightened. As a result, the angle to the perpendicular at which the spike 21 rests in the final position of the strap is much less than it was in the mounting described in connection with FIGURES 1 through 5. At the same time, however, the spike is forced downwardly by the action of the camming member 26 and the spike is forced into engagement with the threads of the lower box ear and locks the mounting strap and wiring device securely in position. It will be recognized that due to the provision of horizontally extending slots in which both the spike 21 and the mounting screw 27 are positioned, the mounting strap and wiring device thereon may be adjusted through a slight range at both top and bottom, to thus provide for aligning the longitudinal center line of the mounting strap and the device as well as of the wall or cover plate which is to be fixed thereto, with the vertical, or in some instances, the horizontal.

While we have described a preferred embodiment of our invention, it will be understood that many variations thereof may be made. We wish therefore, to be limited not by the foregoing description, but on the contrary, solely by the claims granted to us.

What is claimed is:

1. In a mounting strap for mounting an electrical wiring device in an outlet box of the type having apertures at either end thereof adapted to receive fastening means for mounting the strap on the box with the wiring device within the box, the improvement comprising, a slot extending transversely through said strap, first fastening means passing through said slot, a camming lever mounted on the strap and engaging the first fastening means, said slot being positioned to overlie one of the box mounting apertures, said camming lever forcing said strap to move longitudinally toward its opposite end as said fastening means is tightened; a second transverse slot formed in said strap adjacent the end opposite said first fastening means, and a second fastening means mounted in said second transverse slot and extending rearwardly from said strap, said second fastening means extending substantially at right angles to said strap and being fixed with respect to the plane of said strap and movable along said transverse slot.

2. A mounting strap as claimed in claim 1, wherein said second fastening means comprises a serrated spike and wherein said spike has a head with a circumferential groove therein, said second slot having its opposite sides extending into said groove.

3. In a mounting strap for mounting an electrical wiring device in an outlet box of the type having apertures at either end thereof adapted to receive fastening means for mounting the strap on the box with the wiring device within the box, the improvement comprising, a slot extending transversely through said strap, first fastening means passing through said slot, camming lever mounted on the strap and engaging the first fastening means, said slot being positioned to overlie one of the box mounting apertures, said camming lever forcing said strap to move longitudinally toward its opposite end as said first fastening means is tightened, said strap having a portion adjacent said opposite end thereof inclined to the plane of the strap and a second fastening means extending rearwardly substantially at right angles to the plane of said inclined portion, said second fastening means being positioned to engage the aperture at said opposite end of the outlet box.

4. A mounting strap as claimed in claim 3, wherein said inclined portion of said strap inclines rearwardly and toward the first end of the strap, and said second fastening means inclines rearwardly and toward said opposite end of said strap.

5. A mounting strap as claimed in claim 3, wherein said inclined portion of said strap is formed by slitting said strap and pressing the material adjacent to the slit into an inclined position.

6. A mounting strap as claimed in claim 4, wherein a second transversely extending slot is formed in said inclined strap portion and said second fastening means is mounted in said second slot for movement therealong, said second fastening means being fixed with respect to the plane of said inclined portion.

7. A mounting strap as claimed in claim 5, wherein the juncture of said inclined portion and the strap proper is reduced in area so that said inclined portion may move toward the plane of the strap as said first fastening means is tightened.

8. A mounting strap as claimed in claim 3, wherein said second fastening means is a spike having circumferential serrations thereon, said spike having a maximum diameter less than the minimum diameter of said box mounting aperture.

9. A mounting strap in accordance with claim 8, wherein the serrations of said spike are helical threads.

10. A mounting strap as claimed in claim 6, wherein said second fastening means is a headed spike, said head having a circumferential groove therein, said second transverse slot having its opposite sides extending into said groove.

References Cited

UNITED STATES PATENTS 1,807,410   5/1931   Hubbard _____ 174—57
3,059,045  10/1962   Swartwood _____ 174—53

LARAMIE E. ASKIN, *Primary Examiner.*

DAVID A. TONE, *Assistant Examiner.*